United States Patent [19]

Dano

[11] 4,005,367
[45] Jan. 25, 1977

[54] MOBILE TRANSCEIVER HOUSING ASSEMBLY

[75] Inventor: Arnold Vincent Dano, Park Ridge, Ill.

[73] Assignee: Motorola, Inc., Schaumburg, Ill.

[22] Filed: Nov. 3, 1975

[21] Appl. No.: 627,988

[52] U.S. Cl. .............................. 325/352; 312/7 R
[51] Int. Cl.² ......................................... H04B 1/08
[58] Field of Search ............... 312/7 R; 317/101 B, 317/101 CB, 101 DH; 325/15, 111, 119, 352, 353, 355

[56] References Cited

UNITED STATES PATENTS

| | | | |
|---|---|---|---|
| 3,636,413 | 1/1972 | Dithardt | 325/353 X |
| 3,693,089 | 9/1972 | Hutchinson | 312/7 R |

*Primary Examiner*—Benedict V. Safourek
*Attorney, Agent, or Firm*—Margaret Marsh Parker; James W. Gillman

[57] ABSTRACT

A housing for a mobile transceiver has integrally molded aligning and locking features to allow assembly without tools. As the metal support frame and attached printed circuit board enter the housing, short legs on the lower edge of the frame provide support and positioning for guiding the edges of the PC board into molded guide rails along the inner side walls of the housing and into molded locking clips on the inner front wall of the housing. The top rear of the housing is molded with a slight concave bow. The top and bottom rear edges of the housing have ramp portions for admitting the rear of the chassis. As the frame is forced home, a portion of the top rear of the frame pushes on the upper ramp, forcing the top of the housing to yield. Tabs on the bottom rear of the chassis ride up the lower housing ramp and are forced into slots in the housing bottom by the bias of the bowed housing top section. The outer end of each control knob has an indentation which mates with a molded support and alignment pin on the inner front wall of the housing. For both safety and aesthetic reasons, no locking members, controls or pushbuttons protrude beyond the outer contours of the housing.

8 Claims, 6 Drawing Figures

U.S. Patent  Jan. 25, 1977  4,005,367
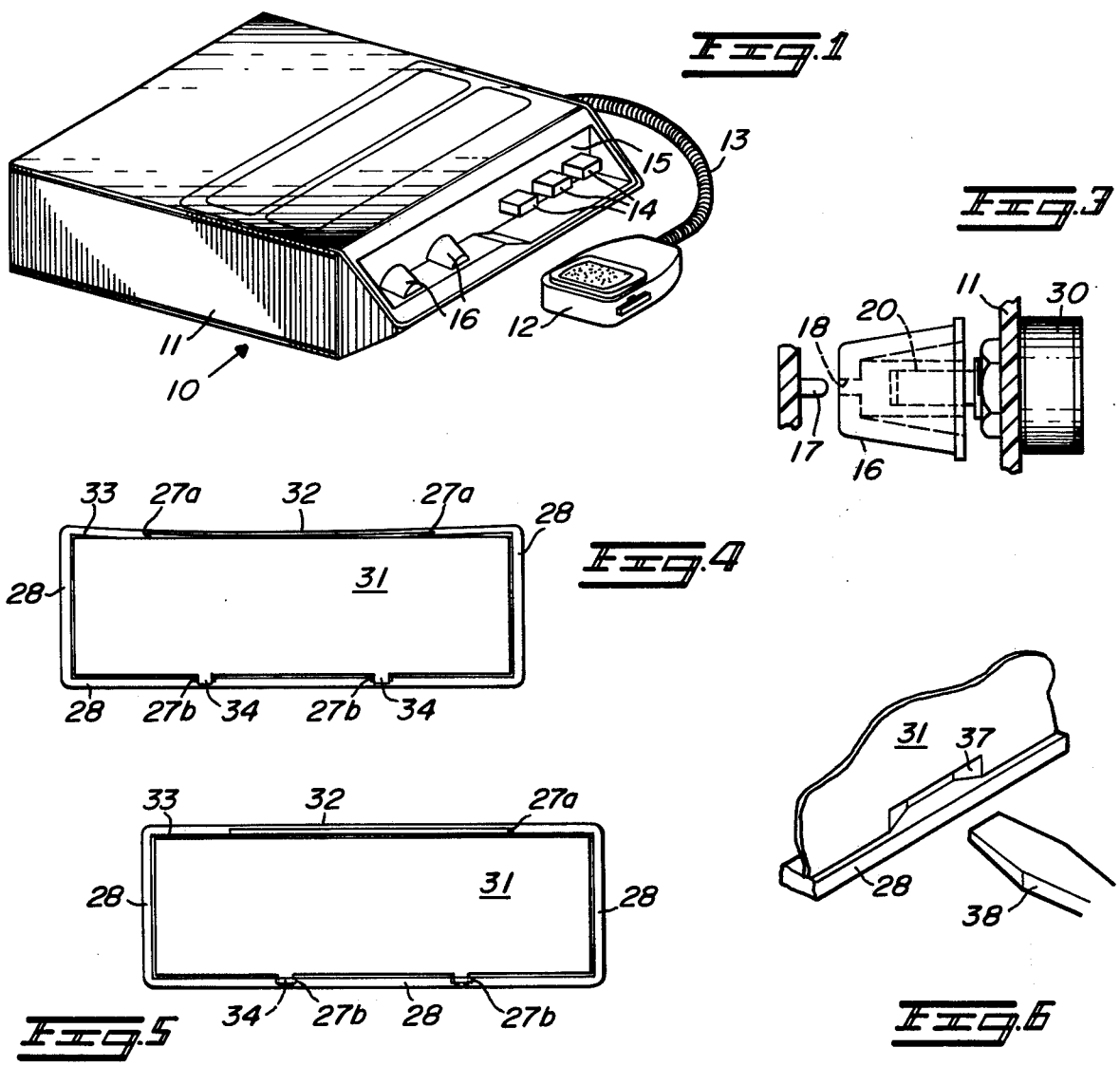
Fig. 1
Fig. 3
Fig. 4
Fig. 5
Fig. 6
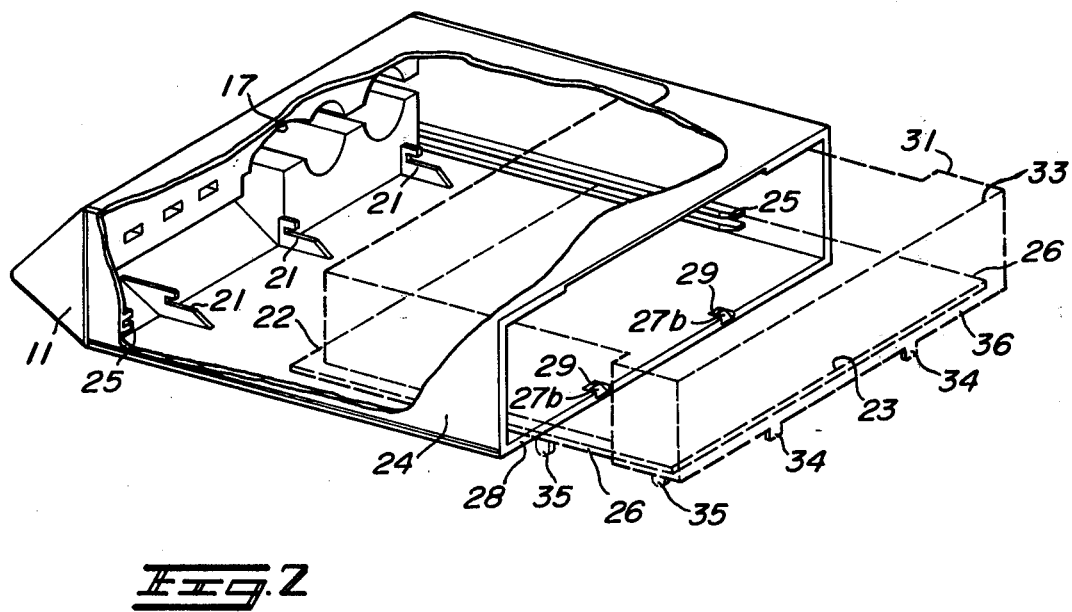
Fig. 2

MOBILE TRANSCEIVER HOUSING ASSEMBLY

BACKGROUND OF THE INVENTION

This invention relates to the field of mobile electronic apparatus and more particularly to a combination of simple assembly procedure and extra ruggedness in operation.

Mobile electronic apparatus such as the two-way equipment carried in automobiles and trucks in subject to severe vibration conditions. The prevention of loosening and subsequent damage to components and connections are a major factor in the design of such apparatus. Both in the factory and in a repair shop, it is desirable, economically and otherwise, to have the assembly and disassembly as simple, and require as few tools, as possible.

SUMMARY OF THE INVENTION

It is therefore an object of the present invention to provide for a mobile electronic apparatus an improved, simple-to-assemble and extremely rugged housing assembly.

The apparatus includes a housing molded of a strong, resilient material, a metal frame for supporting a printed circuit board and the necessary off-board components such as speakers and controls. The support frame includes short legs which position the protruding edges of the printed circuit board in proper alignment with guide rails and locking clips which are integral with the inner walls of the housing. The rear edges of the housing include at least three ramp portions and at least two adjacent slots, and the top surface is slightly bowed inward. As the frame and printed circuit board are inserted into the housing, the center top portion of the rear of the frame rides on the top ramp forcing the housing top surface up, and two locking tabs on the lower edge of the rear of the frame ride up two small ramps and are forced into the adjacent slots by the bias of the bowed top surface. As the frame is pushed into position, the front edge of the printed circuit board is received by the locking clips on the inner front wall of the housing. At the same time, small indentations in the forward ends of the knobs on the control shafts mate with molded projections on the inner front wall of the housing for support and alignment of the control shafts. A screwdriver slot may be provided in the lower rear portion of the support frame to aid in removal of the frame and board if so desired. Knobs and pushbuttons do not have to be removed.

BRIEF DESCRIPTION OF THE DRAWING

The present invention may be best understood with reference to the drawing to which FIG. 1 is a perspective view of a typical unit in which the invention would have application.

FIG. 2 is a cut-away view of the interior of the housing according to the invention.

FIG. 3 includes cut-away portions of the housing and frame and shows the means of extra support for the control shaft and knob.

FIG. 4 is a back view of the unit with the frame almost completely inserted.

FIG. 5 shows the same view as FIG. 4 with the frame completely inserted.

FIG. 6 shows a portion of the rear of another embodiment.

DESCRIPTION OF A PREFERRED EMBODIMENT

Referring now more particularly to the drawings of a preferred embodiment wherein like parts have the same reference numerals throughout, in FIG. 1 there is shown a general view of a two-way communications unit indicated generally by reference numeral 10. A housing 11 has a microphone 12 attached by a cable 13 which connects to the rear of the unit 10. Other cables (not shown) are also connected to the rear of the unit. The entire unit is swivel mounted in the vehicle with a locking arrangement which does not form a part of the present invention. One or more pushbuttons 14 protrude through apertures in a recessed portion 15 of the front of the housing 11. One or more knobs 16 are also mounted for safety in the recessed portion of the housing front, and are additionally partially recessed into the housing and supported as shown in FIG. 3 and further described below. Neither the pushbuttons 14 or the knobs 16 require removal before the housing 11 can be removed.

FIG. 2 is a cut-away view of the housing 11 and shows most of the portions of the housing which make up the aligning and locking features. Integrally formed on one portion of the inner front wall of the housing 11 are one or more support pins 17 (one shown) which are received into indentations 18 (FIG. 3) in the outward end of each of the knobs 16 for positioning and supporting the control knobs and their mounting shafts 20 (FIG. 3). The pins 17 serve an important support function since, in this particular control arrangement, the knobs 16 are turned by applying pressure in two directions; downward for friction, then circumferentially for the appropriate rotation. The position of the inner parts is indicated by dotted lines.

On a different portion of the front wall are two or more integrally formed locking clips 21 which receive and retain tightly a front edge 22 of a printed circuit board 23. Along the side walls 24 of the housing 11 are integrally molded guide rails 25 which receive protruding side edges 26 of the printed circuit board, and guide the board as it moves forward into the locking clips 21. The guide rails 25 are dimensioned to provide a tight fit to retain the board 23 but also to allow for hand removal when desired. Also visible in FIG. 2 are two of the ramps 27b molded into a lower rear edge 28 of the housing 11, and two locking slots 29. The function of the ramps and slots will be explained hereinbelow in relation to FIGS. 4 and 5.

FIG. 3 is a partial cut-away view of the unit 10 showing one of the support pins 17 in relation to one of the knobs 16, the control shaft 20, a control 30 and a section of the front wall of the housing 11 immediately prior to mating of the pin and the knob.

FIGS. 4 and 5 may be best considered together as they represent the same rear view of the unit 10 just before and following complete insertion of the board 23 and its support frame 31. In FIGS. 4 and 5 are shown the ramps 27a,b in housing edge 28 the ramps being inclined toward the interior of the housing 11. In FIG. 4 an inward curvature 32 of the housing top surface blocks a portion 33 of the top rear edge of the support frame 31. Likewise, two locking tabs 34 on the rear of the frame are blocked by the bottom edge of the housing. As thumb pressure is exerted against the rear of the frame 31, the top edge 33 of the frame 31 rides on the top ramp 27a, the locking tabs 34 ride on the bottom ramps 27b, and the top 32 of the housing 11 is forced up, allowing the rear of the frame to enter the housing. When the locking tabs 34 reach a position immediately above the locking slots 29, the tabs are forced into the slots by the bias of the bowed housing top. The locked position is shown in FIG. 5. The frame 31 has short legs or tabs 35 (dotted in on FIGS. 2) which pass through the printed circuit board 23 and may provide ground for the circuit. The legs, together with bottom rear edge 36, provide positioning for the printed circuit board relative to the bottom and guide rails of the housing 11.

An alternate embodiment is shown in FIG. 6 and includes a small slot or indentation 37 at the lower edge of the rear of the frame 31 where a screwdriver 38 (as shown in FIG. 6) or even a coin can be used to apply leverage on the housing edge and unlock the frame for easy removal of the frame from the housing.

What is claimed is:

1. An improved housing arrangement for mobile electronic apparatus having a resilient housing, a printed circuit board, a frame for supporting the printed circuit board and a multiplicity of electromechanical components including rotary controls, the arrangement comprising:
    locking tabs integrally formed on the support frame;
    first support means integrally formed on the interior of the housing for positioning and locking the printed circuit board;
    second support means integrally formed on the interior of the housing for mating with and supporting the rotary controls; and
    locking means integral with the housing for receiving and locking the locking tabs of the support frame into the housing.

2. An arrangement according to claim 1 wherein at least portions of three edges of the printed circuit board extend beyond the support frame and wherein the first support means comprises guide rails on the interior side walls of the housing and locking clips on the interior front wall of the housing, the guide rails and locking clips receiving and engaging the extended edges of the printed circuit board.

3. An arrangement according to claim 1 wherein the locking means comprises at least three inclined portions of the housing edge, at least two of the inclined portions having adjacent apertures, and a concavely formed portion of the housing for biasing the locking tabs of the support frame into said apertures.

4. An arrangement according to claim 1 wherein the support frame further includes integrally formed positioning means for positioning the printed circuit board and other components mounted on the frame relative to the housing.

5. A transceiver assembly having a resilient molded housing and a frame for supporting a printed circuit board and the manual controls therefor, the assembly comprising:
    locking tabs integrally formed on the support frame:
    a first locking means integrally formed on the housing for receiving and retaining the locking tabs of the support frame;
    guide means formed on the inner walls of the housing for receiving and supporting the side edges of the printed circuit board;
    second locking means integrally formed on the inner front wall of the housing for retaining the front edge of the printed circuit board;
    support means integrally formed on the inner front wall of the housing for mating with the manual controls on the support frame.

6. The assembly according to claim 5 wherein portions of at least three of the edges of the printed circuit board extend beyond the support frame and wherein the support frame includes integrally formed positioning means for aligning the protruding edges of the printed circuit board with the guide means in the housing.

7. The assembly according to claim 5 wherein the first locking means comprises at least three inclined portions of the housing edge, at least two of the inclined portions having adjacent apertures, and a concavely formed portion of the housing for biasing the locking tabs of the support frame into said apertures.

8. An improved housing arrangement for electronic apparatus comprising in combination:
    a printed circuit board;
    manual control means having indentations in the forward ends thereof;
    a frame for supporting the printed circuit boards and the manual control means, the frame including at least two locking tabs;
    a housing formed of a strong resilient material, and having one open end and having two apertures adjacent the open end and including integrally
    guide rails along the inner side walls thereof for receiving the side edges of the printed circuit board;
    at least three ramp means formed in the rear edges thereof and adjacent the apertures;
    at least two locking means formed on the inner front wall for retaining the front edge of the printed circuit board;
    support projections formed on the inner front wall for mating with the control knob apertures.

* * * * *